United States Patent
Wallace

Patent Number: 5,202,365
Date of Patent: Apr. 13, 1993

[54] PACKAGED ADHESIVE

[75] Inventor: Richard B. Wallace, Bloomfield Hills, Mich.

[73] Assignee: Reactive Industries, Inc., Troy, Mich.

[21] Appl. No.: 725,595

[22] Filed: Jun. 13, 1991

[51] Int. Cl.$^5$ .......................... C08K 5/01; C08K 59/00
[52] U.S. Cl. .................................. 523/463; 523/428; 523/464; 523/465; 523/87; 523/119; 523/120; 523/121; 523/122; 523/123; 523/124
[58] Field of Search ................. 528/87, 119, 120, 121, 528/122, 123, 124, 103.5, 109; 523/428, 463, 464, 465

[56] References Cited

U.S. PATENT DOCUMENTS

| | | | |
|---|---|---|---|
| 2,939,805 | 6/1960 | Johnson | 117/75 |
| 3,061,455 | 10/1962 | Anthony | 117/37 |
| 3,746,068 | 7/1973 | Deckert et al. | 151/14.5 |
| 4,059,136 | 11/1977 | Wallace | 151/14.5 |
| 4,081,012 | 3/1978 | Wallace | 151/14.5 |
| 4,686,272 | 8/1987 | Wallace | 528/87 |
| 4,764,579 | 8/1988 | Wallace | 528/87 |

Primary Examiner—John Kight, III
Assistant Examiner—Richard L. Jones
Attorney, Agent, or Firm—Thomas P. Liniak

[57] ABSTRACT

The problem of the potential for creation of a reactive noncompressible crust in a fluid adhesive mixture comprising a deposit of an uncured curable fluid curable resin composition and a deposit of a fluid curing agent wherein the deposits are separated by a thin flexible barrier film formed from the interaction of the cured resin as reacted by the curing agent, is overcome by including with the fluid curing agent a thickener in an amount sufficient to render the fluid curing agent non-free-flowing at room temperature and preventing the formation of any substantial amount of noncompressible crust in the mixture.

7 Claims, 1 Drawing Sheet

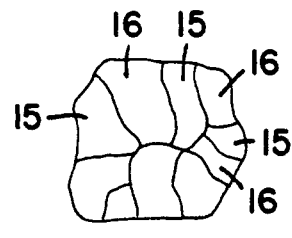
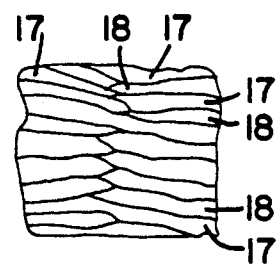
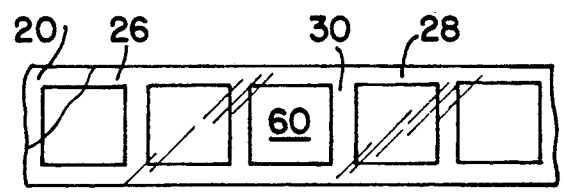
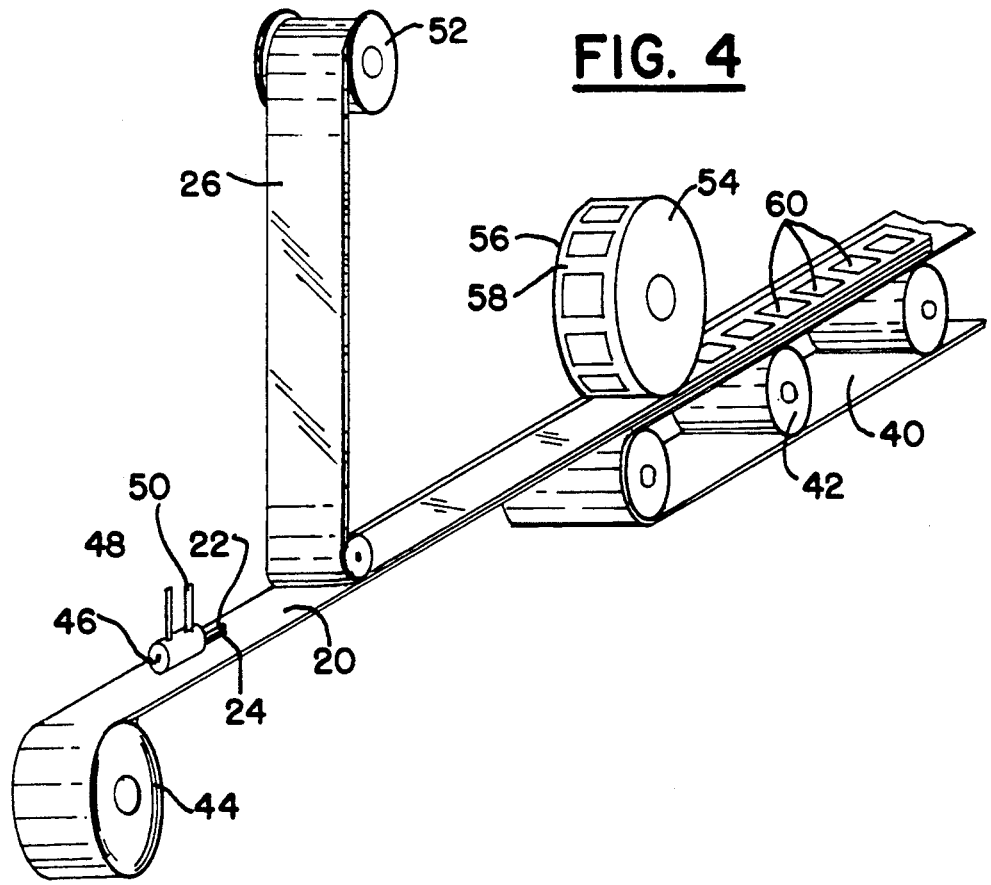

PACKAGED ADHESIVE

FIELD OF THE INVENTION

The present invention relates to a packaged adhesive capable of forming a locking seal between two substrates. In particular, the invention relates to a packaged adhesive which contains an epoxy hardener and resin. The invention also pertains to methods for preparing the packaged adhesive, and to an apparatus for preparing it.

BACKGROUND OF THE INVENTION

It has long been known that a fluid curable resin may be in contact with a fluid curing agent, and both components will remain in their fluid condition until the resin and curing agent are mixed together. This phenomenon is caused by the formation of a very thin barrier film between the resin and the curing agent, resulting from reaction between the resin and curing agent at their contiguous surfaces.

This has been used in the production of self-locking threaded fasteners, where contiguous deposits of a fluid curable resin and of a curing agent have been made in thread grooves, and the contiguous deposits mixed by engagement with the threads of a mating threaded member. This is disclosed in Anthony U.S. Pat. No. 3,061,455, and more particularly in my prior U.S. Pat. Nos. 4,059,136 and 4,081,012, where adjacent thread groove convolutions or portions thereof receive the fluid curable resin and the curing agent therefor. In Johnson U.S. Pat. No. 2,939,805, superimposed layers of curable resin and curing agent were deposited in a thread groove, where a "polymeric membrane was substantially immediately formed between the two coatings."

In addition, pressure activated adhesives were formed by micro-encapsulated fluid curable resin in a fluid curing agent as disclosed in Deckert et al. U.S. Pat. No. 3,746,068.

My U.S. Pat. Nos. 4,686,272 and 4,764,579 described a further advance in this art. These patents disclosed a packaged adhesive and a method for producing it. The packaged adhesive provided a user with a single product containing a mixture of epoxy resin and hardener, thus rendering it unnecessary for a user to separately apply the resin and hardener to a surface.

The packaged adhesive disclosed in U.S. Pat. Nos. 4,686,272 and 4,764,579 comprised a mixture of a multiplicity of small, discrete, contiguous deposits of a fluid, uncured but curable resin, and a fluid curing agent for the particular resin. The contiguous deposits were separated by a thin, flexible, rupturable protective barrier film formed in situ by the reaction by the fluid resin and the fluid curing agent initially in contact therewith.

Variations in temperature or in time and temperature were able to cause the thickness and strength of the film to vary. The thickness and uniformity of the film could, however, be controlled by chilling the deposition, and holding it at reduced temperature, for example, $-10°$ F., overnight.

It was later found that it was desirable to control the size of the deposits in order to optimize the effectiveness of the adhesive package for commercial usage. If the deposits were too large, storage or handling of the package might cause the deposits to rupture and cure. Moreover, storage of the package at moderately high temperatures ($110°$ F.) led, in certain situations, to the formation of a reactive crust which detracted from the aesthetic characteristics of the packaged adhesive.

A packaged adhesive, capable of (1) providing both a curable resin and a curing agent for the resin in a single application, and (2) enhanced resistance to curing upon storage or handling would thus be highly desired. The present invention provides such an advance.

SUMMARY OF THE INVENTION

The present invention relates to an improvement to the packaged adhesive of U.S. Pat. Nos. 4,686,272 and 4,764,579. Thus, it provides a single package containing a fluid, self-curing or settable adhesive for general application. The adhesive comprises a mixture of a non-viscous, fluid, uncured but curable resin, and a viscous, thickened fluid curing agent for the particular resin. The contiguous deposits are separated by a thin, flexible, rupturable protective barrier film formed by an in situ reaction at the surface of the thickened curing agent deposits in contact with the fluid resin.

The resin and curing agent may be simultaneously supplied through adjacent nozzles to create a mass of the mixture. In one embodiment of the invention, the resin is supplied in a series of pulses, as separate deposit of resin or agent by sequential pump strokes, so that each stroke produced is separated by the barrier film. Alternatively, the resin and curing agent may be supplied through adjacent nozzles as continuous, side-by-side contiguous deposits onto an advancing thin tape. Preferably, this is achieved by moving the nozzles in an opposing reciprocating action about an axis extending along the path of advance of the tape, so that a continuous rope-like deposit of separate strands results.

A protective cover tape is applied over the deposit. The tapes are heat sealable, and sealing seams are provided along the edges of the tapes, and at short intervals across the tapes. This displaces the resin and curing agent between the tapes and produces a series of severable sealed packets, in which the sealed globules may be ruptured by kneading the packet, and the intimately mixed resin and curing agent squeezed out through an opening provided by cutting a corner from the packet.

The fluid resin globules may, of course, be controlled as to size by the amount supplied by each pulse or "shot" of the fluid supplied to the mixture. The controlling factors are that the individual coated deposits must be large enough so that only a minor portion thereof is reacted to produce the barrier film. In general terms, the individual sealed deposits are substantially larger than well known micro-encapsulated materials, preferably several times larger, but small enough to facilitate intimate mixing with the curing agent when the globules are ruptured. The individual globules may be a few (1–5) mm in a transverse direction, and the barrier film of a thickness represented by only a few molecules.

BRIEF DESCRIPTION OF THE FIGURES

FIGS. 1–2 represent a magnified different cross sections of the fluid adhesive.

FIG. 3 is a plan view of a continuous tape incorporating the adhesive mixture.

FIG. 4 is a perspective view of apparatus for producing an elongated series of packets of the adhesive mixture.

DESCRIPTION OF THE PREFERRED EMBODIMENTS

The present invention relates to an adhesive which is a mixture of different fluids. One of the fluids comprises an uncured, curable fluid resin, such as, for example, an epoxy resin. Another of the fluids is a curing agent for the selected resin, such as for example, an amine when the resin is epoxy, as is well understood in the art.

The composition of the present invention is, most preferably, in the form of a multiplicity of small, discrete, contiguous deposits of the different fluids, in which adjacent deposits are separated by a thin, flexible, rupturable barrier film formed of the cured resin as reacted by the fluid curing agent in the mixture.

The specific shape and size of the separate deposits is not directly observable, but may be inferred from the method of deposition.

In one embodiment of the present invention, deposition of the two fluids is made simultaneously, as by forcing the fluids through adjacent nozzles to create mass. When the fluids, or at least the resin, is forced intermittently into the mass, the resulting deposits may be in the form of small, discrete bodies which are aptly described as globules. This is not intended to imply spherical or even roughly spherical deposits. The deposits may be random and irregular, and in some cases elongated more or less continuous strands.

In a second embodiment of the invention, the physical shape of the deposits may be the result of forcing a continuous stream, uniform or pulsating, of the different fluids onto a moving belt, and where the contiguous nozzles through which the fluids are forced are reciprocated through an angle of from about 135° to about 180° about an axis generally parallel to the path of advance of the belt. The resulting deposit may be likened to a rope formed of twisted strands.

The fluids are referred to as fluids, and results may be controlled by separately controlling the fluidity or viscosity of the fluids. This in turn may be controlled in part by controlling the temperature of the fluids at the time of deposit. For convenience, this will normally be room temperature, more preferably, +40° F.

As indicated above, the compositions described in my prior U.S. Patents occasionally formed a reactive, noncompressible crust. Although this crust became an integral part of the cured composition, its presence in the uncured material detracted from the aesthetic appearance of the material. Surprisingly, it was found that the presence and appearance of the crust could be substantially altered through the use of a curing agent having high viscosity.

Thus, in a preferred embodiment, the curing agent will most preferably have substantial viscosity, such that it is not free flowing at room temperature. In contrast, the fluid curable resin will most preferably be of low viscosity, such that it is readily pourable and flowable at room temperature. In such a preferred embodiment of the invention, the curing agent will have for example, a paste-like consistency at storage or room temperature.

By thus altering the viscosity of the resin and curing agents, the resultant adhesive package exhibited a greater improvement in temperature resistance as compared to the compositions in the packaged adhesive of U.S. Pat. Nos. 4,686,272 and 4,764,579. Significantly, such an improvement was not noted when the viscosity of the resin was increased and that of the curing agent was decreased.

In an especially preferred embodiment, the thickened hardener will contain linseed oil. Preferably, the linseed oil is blended into the hardener with a power mixer. The linseed oil is preferably present in an amount of between about 5% (by volume) to about 35% (by volume) of the hardener. Most preferably, it will be present in an amount of about 20% (by volume) of the hardener.

In a second especially preferred embodiment, the thickened hardener will contain ethoxylated bisphenol A dimethacrylate (EBAD). The structures of this compound is shown below:

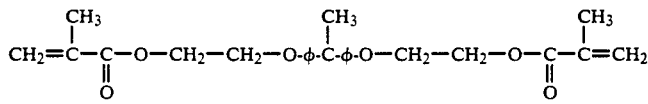

Ethoxylated Bisphenol A Dimethacrylate

Preferably, the EBAD is blended into the hardener with a power mixer. The EBAD is preferably present in an amount of between about 5% (by volume) to about 30% (by volume) of the hardener. Most preferably, it will be present in an amount of about 15% (by volume) of the hardener.

The inclusion of EBAD or linseed oil further improves the packaged adhesive. Compositions which contain such compounds do not form a continuous film crust at, for example, 110° F., but rather form tiny soft granules which are scattered throughout the dispersed mix. Since the formation of the granules does not detract from the aesthetic appearance of the formulation, the composition is an improvement over those disclosed in my prior U.S. Patents.

Without in any way limiting the present invention, the EBAD is believed to serve the same purpose and to function in the same way as the above-described linseed oil.

The specific size of the different deposits may vary widely, but the essential factor is that the thickness of the barrier film shall be extremely small compared to the transverse dimension of the adjacent deposits which are separated by the film. The film should be only sufficiently thick to terminate curing of the resin as a result of contact with the fluid curing agent. The size of the discrete deposits of fluids is limited by the ability of the barrier films to maintain separation of the contiguous deposits of different fluids. The transverse dimension of the deposits, and particularly the resin deposits, is probably 1-5 mm and large deposits will ordinarily divide spontaneously.

Best results are obtained by immediately chilling of the mixture. Chilling to −10° F., and holding this temperature overnight for a minimum of about twelve hours, has proved effective to arrest the growth of the barrier film. The film as thus formed is of more uniform minimum thickness. After the chill treatment, the mixture is no longer affected by relatively high temperatures, as for example 115° F.

A further reason for chilling the deposited mixture after deposition is noted. Where the specific gravity of the uncured fluid resin and fluid curing agent are different, relative movement therebetween under the influence of gravity may produce a further mixing which tends to cause excessive curing of the resin. This movement is prevented by prompt chilling of the mixture, as previously described, until the formation of the protective film is complete. It is further inhibited by the use of the viscous curing agent. Good results are obtained by cooling to about −10° F. for about twelve hours, and film thickness can be controlled by variations in time and temperature.

The resin of the invention may be any suitable resin, for example, an epoxy resin, a suitable example being a commercially available bisphenol A epichlorohydrin resin. The most preferred bisphenol A epichlorohydrin resin is an epoxy bisphenol A epichlorhydrin resin. Such a resin can be obtained by reacting bis phenol A and epichlorohydrin. The preferred resin of the present invention may also be obtained commercially (EPON 828 ™, Shell Chemical). This preferred resin is an uncrosslinked, short-chain prepolymer, rather than a monomer. An appropriate curing agent is selected for the particular resin, such for example, a suitable multi-functional amine (such as benzyldimethylamine ("BDMA") or 2,4,6 tri-dimethylaminomethylphenol (NX-3)) for an epoxy. The most preferred agent is an aliphatic amine, especially "Pacific Anchor "AD" Hardener." The ratio of hardener to resin is preferably about 9 parts hardener to about 10 parts resin, but may range from about 1 part hardener to about 15 parts hardener for about every 10 parts resin.

Many hardeners and catalyst can, however, be used in accordance with the invention. Each has its ideal stoichiometric ratio with the resin or resin blend used and the high and low variations used to produce any desired special effects (such as softness or flexibility). One such suitable combination is polyester resins and urethane 2-part adhesives of unknown composition. Examples of other combinations include: bisphenol A epichlorhydrin resin and aromatic amines, aliphatic amines (especially "Pacific Anchor "AD" Hardener"), polyamines, cycloaliphatic amines, amidoamines, liquid polyamines, tertiary amines (especially NX-3), anhydrides, Imidazoles, Mercaptans, Lewis Acid Catalysts (especially XU-195).

FIG. 1 represents a cross-sectional view of one embodiment of the deposited mixture. Here irregularly shaped deposits 15 represent deposits of resin, and contiguous irregularly shaped deposits 16 represent deposits of the curing agent. It will be understood that the single lines separating areas 15 and 16 represent the cured barrier film.

In FIG. 2, the elongated strands 17 and 18 separately represent the fluid resin and curing agent and the random arrangement suggested in this figure follows from reciprocation of a nozzle head with a plurality of contiguous nozzles through which fluid resin and curing agent are separately fed, either uniformly or in "pulses."

The proportions of resin and curing agent are determined by the quantity of agent required to effect a cure of all resin in the mass.

The minimum size of the deposits is such as to leave an effective amount of resin in fluid state within each deposit, and this in turn is determined in part by the thickness of the protective barrier form of reacted resin which is effective to terminate the reaction. In general, this film may be extremely thin, as for example measured in microns. The deposits of resin may be of a size determined by drop formation in accordance with the surface tension thereof, or they may be substantially larger.

The deposits, enclosed by the barrier film as described, may be contrasted with known micro-encapsulated resins by the fact that the enclosure is a film of cured portions of the uncured resin enclosed thereby, that the barrier film is much thinner than known micro-encapsulating material, that the barrier film is extremely flexible and readily rupturable, and that the enclosed deposit can be maintained only in the fluid mixture as contrasted with micro-encapsulated material in which the micro-capsules are independently self-supporting.

A further sharp distinction between the adhesive mixture of the present invention, and a mixture of pre-formed micro-capsules of uncured resin in a fluid carrier comprising a curing agent, is that the enclosed deposits of the present invention are formed in situ by in effect injecting small masses or deposits of resin and curing agent simultaneously into a fluid mass so that the enclosing fill, which limits polymerization of the curable resin, is formed of cured resin resulting from interaction between the resin and curing agent.

The novel adhesive mixture lends itself to deposition into enclosures such as the recess in a wire nut disclosed for example in Stockwell U.S. Pat. No. 2,825,750, after which the deposited mixture can be protected by a cover film of polyvinyl alcohol.

It also lends itself to production of sealed packets in which the mixture retains its overall fluidity for long periods. Such packets may comprise spaced sheets of flexible material, such for example as heat sealing polyethylene, having a thickness of about 6 mils, for example. To use, the individual packet may be manually kneaded to rupture the films enclosing the individual globules of uncured resin and to mix the fluid resin intimately with the curing agent. Thereafter, the adhesive may be squeezed from an opening in the packet, produced for example by cutting or tearing a corner therefrom. The application of the adhesive may thus be accomplished by the user without it coming in contact with his hands.

A specific embodiment in accordance with the foregoing was produced by forming envelopes of polyethylene sheet material about one inch square with one edge open. Into these envelopes three or four substantially simultaneous injections of fluid uncured epoxy resin and a fluid amine epoxy curing agent were made. The openings in the envelopes were then heat sealed and promptly chilled to greatly retard curing of the resin. The product was found to retain the adhesive in fluid condition for long periods. It was found that heating the packets to about 115° F. after chilling had no harmful effect, and the packet contents remained fluid.

This provides a highly useful product, in which the packet can be kneaded while sealed for mix, and then dispensed to the job via a clipped corner. It avoids the messy "two bottle" or "two tube" packaging which get progressively "gunkier" as they are repeatedly used. It provides a neat, disposable, single pack for any curable resin or equivalent material the market dictates as suitable.

In FIGS. 3 and 4, there is diagrammatically illustrated an apparatus for producing the sealed packets, and an elongated series of interconnected packets.

Here, a lower tape 20 preferably transversely cupped of a thin heat sealable material, such as 6 mil polyethylene, is advanced and onto it, as contiguous streams of uncured fluid resin and fluid curing agent are continuously applied through two or more adjacent nozzles 22, 24.

Preferably, the nozzles apply the compositions in a "burst" or "shot," although a stream application may be used. The use of a "burst" or "shot" deposit creates a series of bar sealable regions, which may be sealed without displacing any deposited material. This is a preferred method of forming the deposits of the present invention.

In a less preferred embodiment, the nozzles are moved in an opposing reciprocating motion (from about 135° to about 180°) from side to side of the tape 20 and thus produce in effect a rope or twisted strands of resin and curing agent as seen in FIG. 2. Alternatively, such a rope or twisted strand may be produced by rotating the nozzles about an axis extending longitudinally of the tape 20. The curing agent is provided at a rate sufficient to in effect envelope the strands of resin, and forms a barrier film of cured resin surrounding the resin deposits to limit the curing reaction, leaving a quantity of fluid curing agent sufficient to cure the remainder of the resin when mixed therewith.

A cover tape 26 of heat sealable polyethylene is applied over the deposit of resin and curing agent on the bottom tape. If the deposits are made in bar sealable regions, a heated bar can be positioned to seal the deposits into packets. Alternatively, the material can be advanced beneath a heated roller or the like. In either embodiment, sealing is effective to provide sealed edge areas 28, and transverse sealed areas 30. If the material is applied as a continuous stream, the application of pressure to the sealed areas displaces the fluid deposit, and provides for an effective heat seal.

In FIG. 4, there is diagrammatically shown an apparatus for producing the series of packets shown in FIG. 4. A conveyor 40, movable on rollers 42 receives the lower tape 20 from a supply roll 44. The contiguous, preferably pulsed deposits of uncured fluid resin and the fluid curing agent therefor are made through nozzles 22, 24. The deposited material is thus in the form of discrete "shots" on the tape 20. Alternatively, as indicated above, a stream of material can be applied.

A cover strip or tape 26 is fed from a supply roll 52 and overlies the deposited material.

Where a stream of material has been applied, a patterned, heated roller 54 is provided having at its edges continuous raised areas 56 with spaced transverse areas 58. Areas 56 provide the continuous edge seals 28. The areas 58 displace the deposited material from between tapes or strips 20 and 26, and form the transverse sealed areas 30. The adhesive mixture is thus trapped in sealed envelopes 60, as seen in FIG. 3.

Where the material is deposited in bar sealable regions, heat sealing can be accomplished without displacing the product.

The elongated structure produced is severed into suitable length and is preferably chilled or cooled before or after severing, to insure stability of the material until the curing of the surfaces of the globules is complete.

It is essential that the enclosed globules may be ruptured by a manual kneading operation, but until such operation, retain the uncured resin in fluid condition together with the fluid carrier which comprises the curing agent.

An alternative to the soft kneadable packets is the provision of the mixture in collapsible tubes. In this case, the nozzle of the tube through which the fluid mixture is dispensed, is restricted and suitably shaped as for example, reticulated to ensure rupture of the films enclosing the globules of uncured resin and thorough mixing with the curing agent as the material is forced through the nozzle.

When the specific gravity of the uncured resin and the fluid curing agent are different, relative movement therebetween under the influence of gravity may produce a further mixing action with tends to cause excessive curing of the resin. This may be prevented by cooling or chilling the mixture, as previously described, until the action of forming a protective barrier film about the deposits of resin is complete. Good results have been accomplished by cooling the mixture to about −10° F.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. In a fluid adhesive mixture of different fluids in which one of said fluids comprises an uncured, curable fluid resin and another of said fluids comprises a fluid curing agent for said resin, said mixture being in the form of a multiplicity of substantially discrete contiguous deposits of the different fluids in which adjacent deposits are separated by a thin flexible rupturable barrier film formed of the cured resin as reacted by the curing agent, and wherein said adhesive mixture has the potential for forming a reactive, noncompressible crust, the improvement comprising, said mixture being substantially free of a reactive, noncompressible crust and wherein said uncured, curable fluid resin is free-flowing at room temperature and said fluid curing agent includes a thickener in an amount sufficient to render said fluid curing agent non-free-flowing at room temperature and to prevent the formation of any substantial amount of a noncompressible crust in said mixture, wherein said thickener is selected from the group consisting of linseed oil and ethoxylated bisphenol A dimethylacrylate.

2. The fluid adhesive mixture according to claim 1 wherein said curing agent comprises a hardener for said resin and linseed oil in an amount of about 5%–35% by volume of said hardener.

3. The fluid adhesive mixture according to claim 2 wherein said linseed oil is in an amount of about 20% by volume of said hardener.

4. The fluid adhesive mixture according to claim 1 wherein said curing agent comprises a hardener for said resin and ethoxylated bisphenol A dimethacrylate in the amount of about 5%–30% by volume of said hardener.

5. The fluid adhesive mixture according to claim 4 wherein said ethoxylated bisphenol A dimethacrylate is in an amount of about 15% by volume of said hardener.

6. The fluid mixture according to claim 2 wherein said uncured, curable fluid resin comprises an epoxy resin and said hardener comprises a multifunctional amine.

7. The fluid mixture according to claim 4 wherein said uncured, curable fluid resin comprises an epoxy resin and said hardener comprises a multifunctional amine.

* * * * *